United States Patent
Bulcher et al.

(10) Patent No.: US 10,583,785 B1
(45) Date of Patent: Mar. 10, 2020

(54) ODOR ELIMINATING VEHICLE CARGO CARRIER

(71) Applicants: Timothy A. Bulcher, Waynesville, OH (US); Amy L. Bulcher, Waynesville, OH (US)

(72) Inventors: Timothy A. Bulcher, Waynesville, OH (US); Amy L. Bulcher, Waynesville, OH (US)

(*) Notice: Subject to any disclaimer, the term of this patent is extended or adjusted under 35 U.S.C. 154(b) by 0 days.

(21) Appl. No.: 16/018,141

(22) Filed: Jun. 26, 2018

Related U.S. Application Data

(60) Provisional application No. 62/526,480, filed on Jun. 29, 2017.

(51) Int. Cl.

| | |
|---|---|
| B60R 9/00 | (2006.01) |
| B60R 9/055 | (2006.01) |
| B60R 9/042 | (2006.01) |
| B65D 5/42 | (2006.01) |
| B65D 81/26 | (2006.01) |
| B60R 9/058 | (2006.01) |

(52) U.S. Cl.
CPC .............. B60R 9/055 (2013.01); B60R 9/042 (2013.01); B60R 9/058 (2013.01); B65D 5/4295 (2013.01); B65D 81/263 (2013.01); B65D 2205/02 (2013.01)

(58) Field of Classification Search
CPC ......... B60R 9/055; B60R 9/042; B60R 9/058; B65D 5/4295; B65D 81/263; B65D 2205/02
USPC .................................................. 224/309–331
See application file for complete search history.

(56) References Cited

U.S. PATENT DOCUMENTS

| 1,939,312 | A | * | 12/1933 | Murray | ................. | E06B 7/082 454/195 |
| 4,136,464 | A | * | 1/1979 | Hay | ..................... | A47L 23/20 239/274 |
| 4,793,535 | A | * | 12/1988 | Johnson | ................. | B60R 9/048 206/315.1 |
| 5,632,099 | A | * | 5/1997 | Seifert | .................. | A47L 23/205 34/106 |
| 7,189,158 | B2 | * | 3/2007 | Motszko | ............. | B60H 1/00378 165/203 |
| 7,877,922 | B1 | * | 2/2011 | Petrie | ...................... | A01K 97/08 206/315.11 |
| 8,857,072 | B1 | * | 10/2014 | Cocker | ................... | F26B 9/003 34/103 |

(Continued)

*Primary Examiner* — Peter N Helvey
(74) *Attorney, Agent, or Firm* — Frost Brown Todd, LLC; Todd A. Spears

(57) ABSTRACT

A vehicle cargo carrier includes a coupling assembly, and a storage assembly. The coupling assembly can selectively attach to a vehicle. The storage assembly can selectively attach to the coupling assembly. The storage assembly includes a first storage body, a second storage body, and a fluid redirection member. The first storage body defines an inflow vent that can receive fluid from an exterior of the first storage body toward an interior of the first storage body. The fluid redirection member includes a base and an insertable extension. The base is attached to either the interior of the first or second storage body. The base defines a first open end that can receive a portion of the fluid from the inflow vent. The insertable extension defines a second open end such that the second open end and the first open end are in fluid communication.

20 Claims, 17 Drawing Sheets

(56) References Cited

U.S. PATENT DOCUMENTS

| | | | |
|---|---|---|---|
| 2002/0125285 A1 | 9/2002 | Parks et al. | |
| 2005/0194414 A1* | 9/2005 | Lynch | B60R 9/055 224/401 |
| 2011/0197464 A1* | 8/2011 | Chappell | F26B 9/003 34/202 |
| 2014/0097219 A1* | 4/2014 | Reiber | B60R 9/055 224/310 |

* cited by examiner

ODOR ELIMINATING VEHICLE CARGO CARRIER

PRIORITY

This application claims priority to U.S. Provisional Patent App No. 62/526,480, entitled "Odor Eliminating Vehicle Cargo Carrier," filed Jun. 29, 2017, the disclosure of which is incorporated by reference herein.

BACKGROUND

Vehicle cargo carrier systems allow for storage and transport of items outside of the vehicle interior. Traditionally, vehicle cargo carrier systems are used to provide additional storage capacity. For instance, when traveling long distances with a maximum number of passengers, it may not be feasible to store all items within the vehicle interior. Therefore, a vehicle cargo carrier system may be attached to the exterior of the vehicle with the purpose of providing additional storage space to save room for passengers and/or other items in the vehicle interior. Because a primary purpose of many vehicle cargo carrier systems is to provide additional storage capacity, vehicle cargo carrier systems are generally bulky and difficult to move by hand. Additionally, because many vehicle cargo carrier systems are used to store items outside the vehicle interior, many cargo carrier systems are designed to prevent the cargo carrier interior from being exposed to the elements during transport.

While various kinds of vehicle cargo carrier systems have been made and used, it is believed that no one prior to the inventor(s) has made or used the invention described below.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1A:
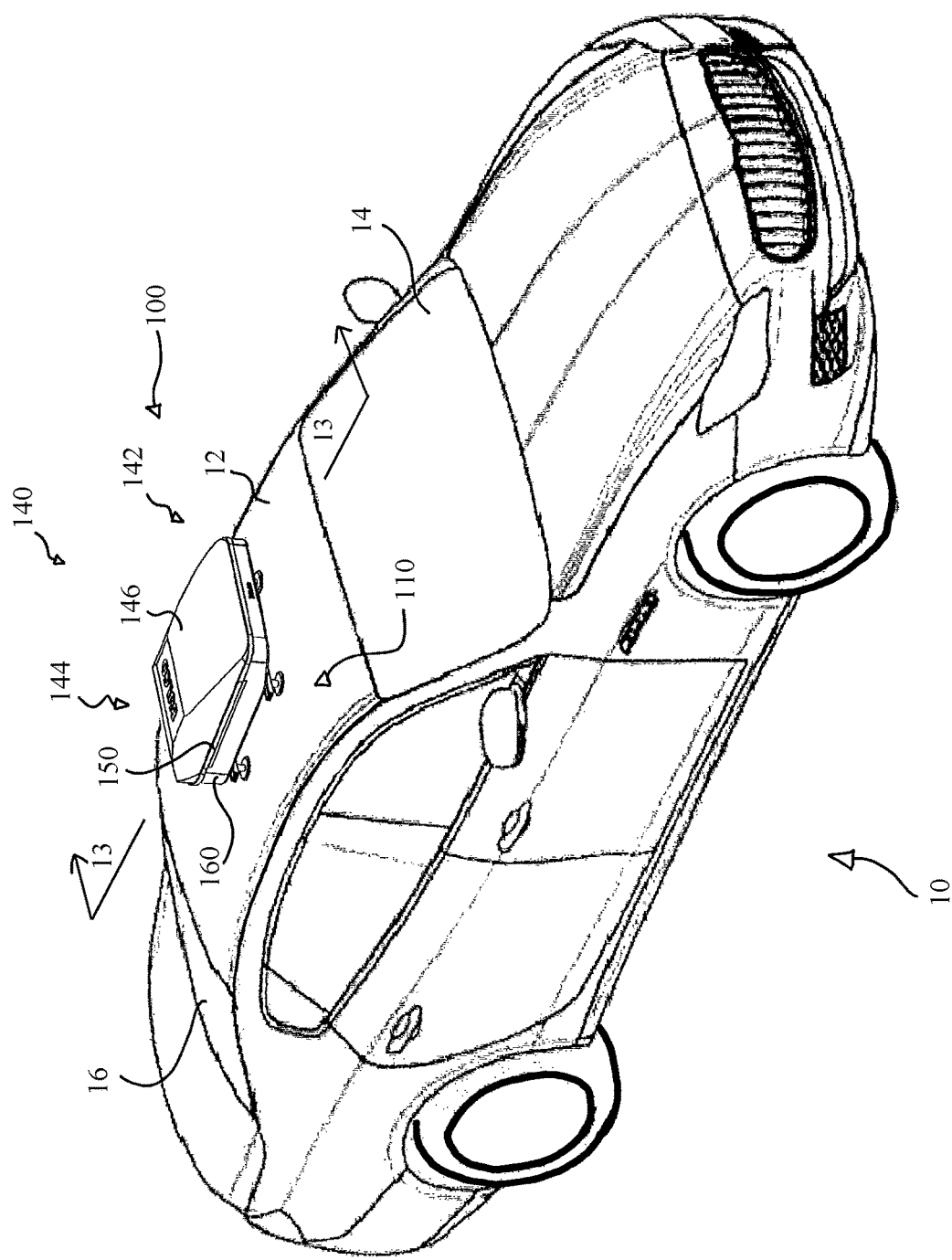
FIG. 1A depicts a perspective view of a vehicle cargo carrier system including a coupling assembly and a storage assembly, where the coupling assembly is attached to the roof of a vehicle and the storage assembly is attached to the coupling assembly.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration. As will be realized, the technology described herein is capable of other different and obvious aspects, all without departing from the technology. Accordingly, the drawings and descriptions should be regarded as illustrative in nature and not restrictive.

I. Exemplary Vehicle Cargo Carrier System with Odor Eliminating Features

As mentioned above, vehicle cargo carrier systems are traditionally used to store and transport excess items in lieu of, and to create additional space within, the vehicle interior. Therefore, most vehicle cargo carrier systems have an interior restricted from exposure to the elements, are bulky, and are difficult to attach and detach from the vehicle.

However, in some instances, it may be desirable to store and transport items external from the interior of a vehicle for reasons other than creating additional space. Some items may have undesirable qualities such that a person may want to store and transport those items for the reason of preventing items from entering the interior of a vehicle. For example, one undesirable quality may include an unpleasant odor such that storing and transporting smelly items in the interior will leave a fetor or foul stench that may linger even after the items are removed. Some items might be wet or dirty such that storing and transporting wet or dirty items in the interior will soil or blemish the interior of the vehicle. Examples of items that may be wet, dirty, and/or have a foul smell may include used shin guards, athletic shoes, jerseys, padding, or other sweaty sports equipment.

In addition to preventing items with undesirable qualities from entering the interior of a vehicle, a person may also want to partially or fully remedy the undesirable quality of such items during transport. In other words, it may be desirable for a user to load an item that is wet and/or smelly before transport, then remove the item after transport with a reduction in foul fragrance and/or wetness. Many items, such as an athletic shoe, may have an exterior portion and an interior portion. It may be difficult to specifically remedy the undesirable qualities of both the interior and exterior portions.

Additionally, in some instances, items with undesirable qualities are stored and transported on short and/or repetitive trips while taking up a negligible amount of space. For example, a parent may frequently drive their vehicle to pick up their children from sports practice multiple times a week. After sports practice, children may have several sweaty used items that a parent may wish to transport on the exterior of the vehicle. It may be desirable to place used sports equipment into the vehicle cargo carrier after practice, drive home, and remove the used sports equipment from the vehicle cargo carrier after arriving home. Therefore, it may be desirable to have an exterior storage that is small, light-weight, and/or easily accessible such that even a small framed person may attach and detach the cargo carrier from a vehicle multiple times without excessive physical burden.

Figure 1B:
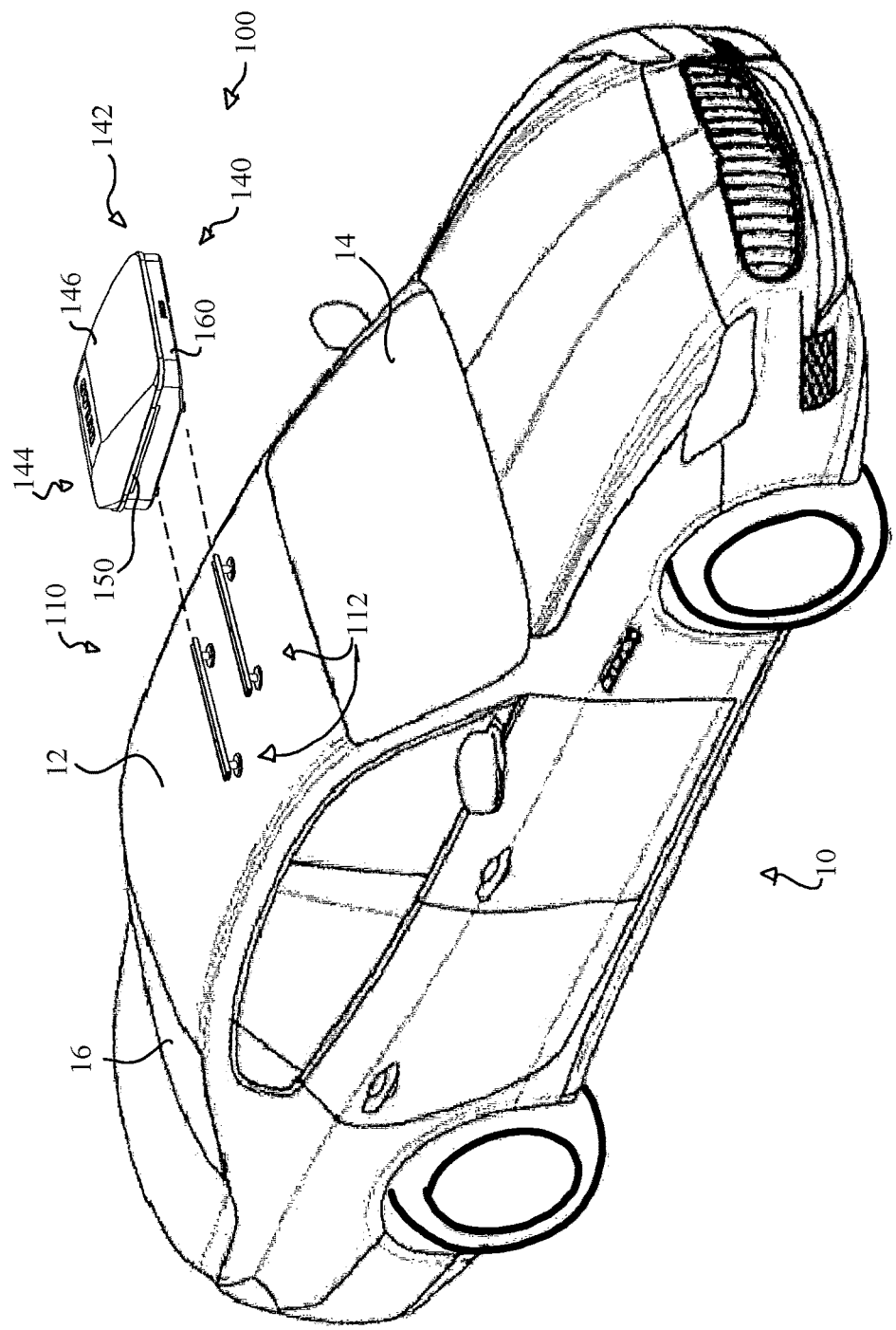
FIG. 1B depicts a perspective view of the vehicle cargo carrier system of FIG. 1A, where the coupling assembly is attached to the roof of the vehicle in FIG. 1A and the storage assembly is detached from the coupling assembly.
Figure 2:
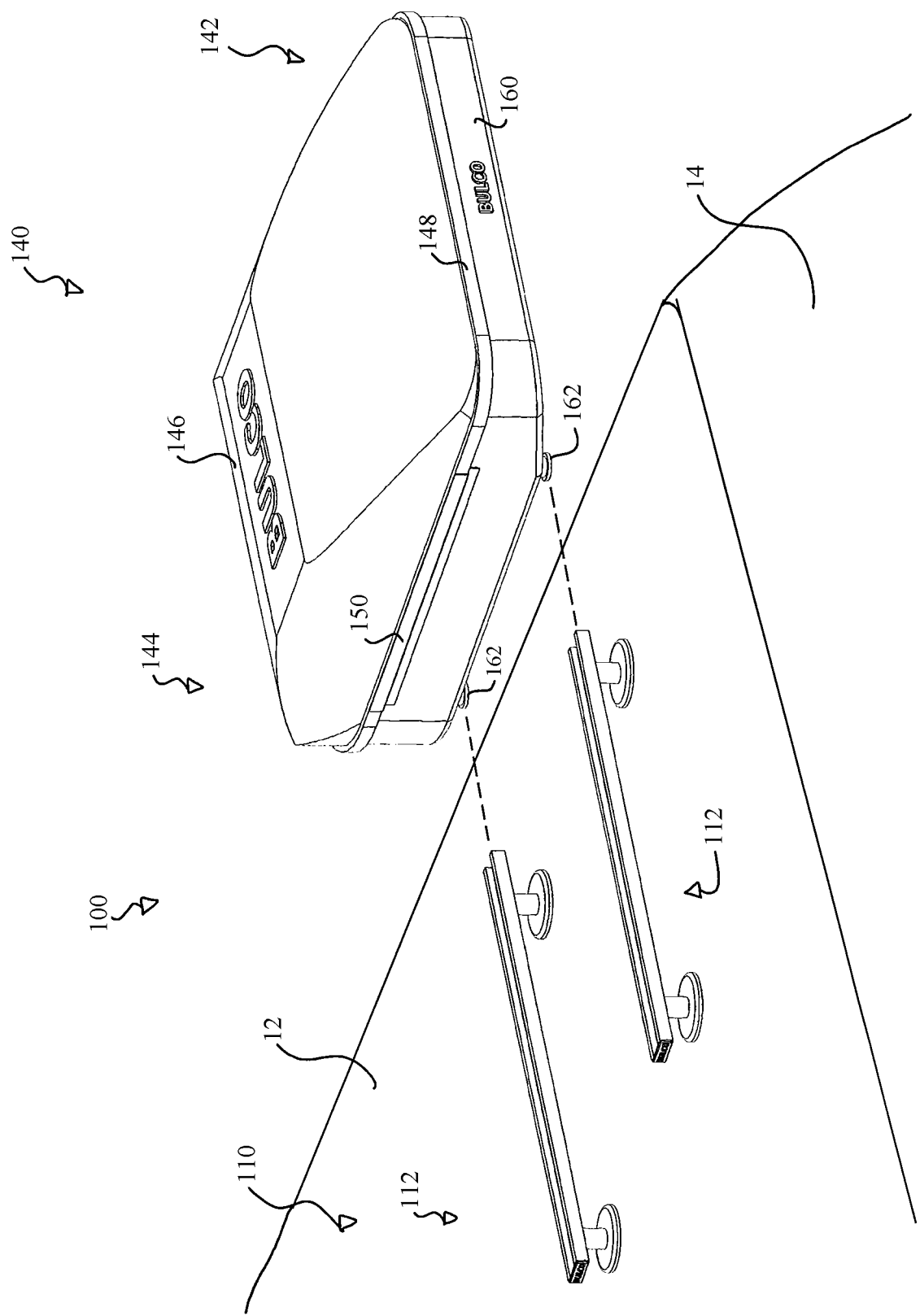
FIG. 2 depicts another perspective view of the vehicle cargo carrier system of FIG. 1A, where the coupling assembly is attached to the roof of the vehicle in FIG. 1A and the storage assembly is detached from the coupling assembly.
Figure 3:
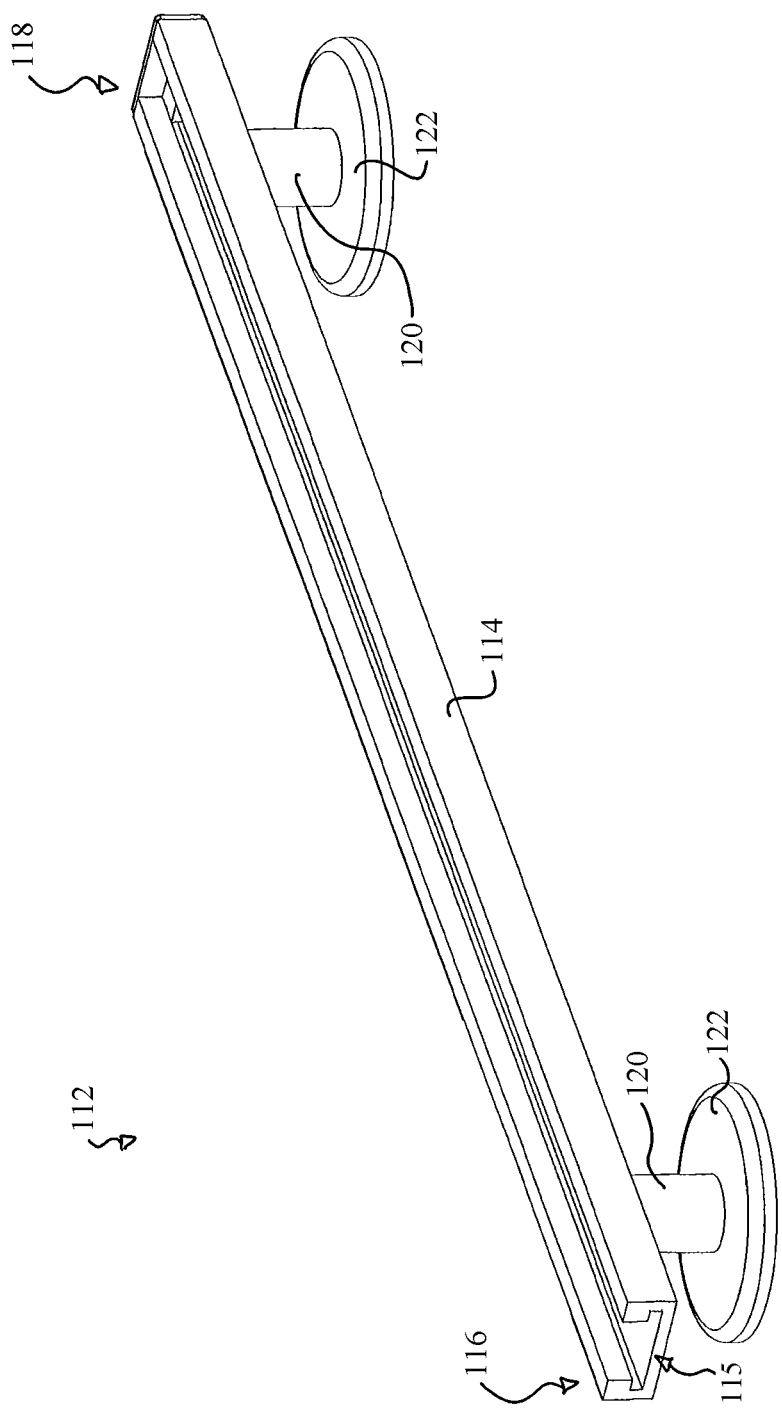
FIG. 3 depicts a perspective view of an attachment rail assembly of the coupling assembly of FIG. 1A.
Figure 4:
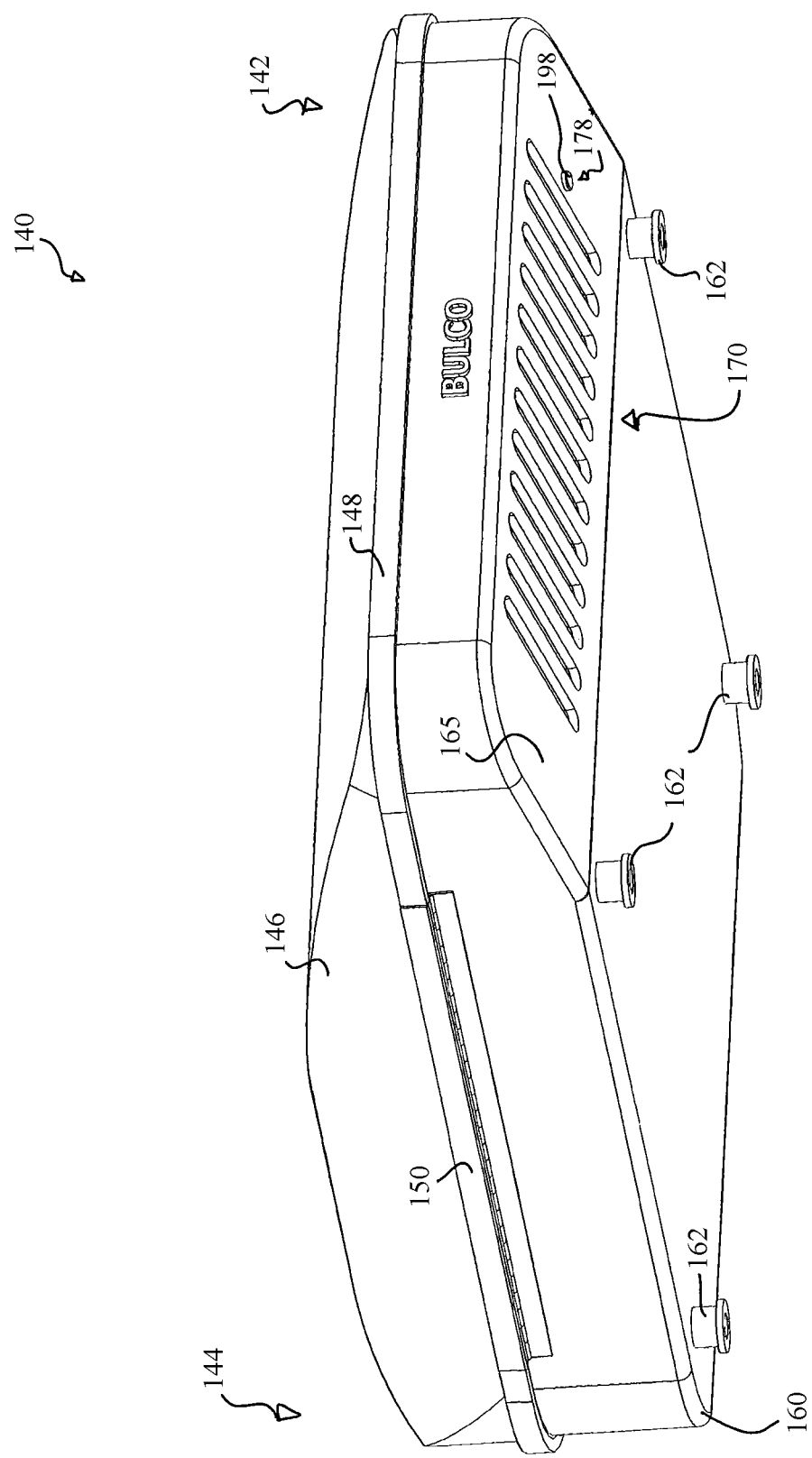
FIG. 4 depicts a perspective view of the storage assembly of FIG. 1A, where the storage assembly is in a closed configuration.
Figure 5:
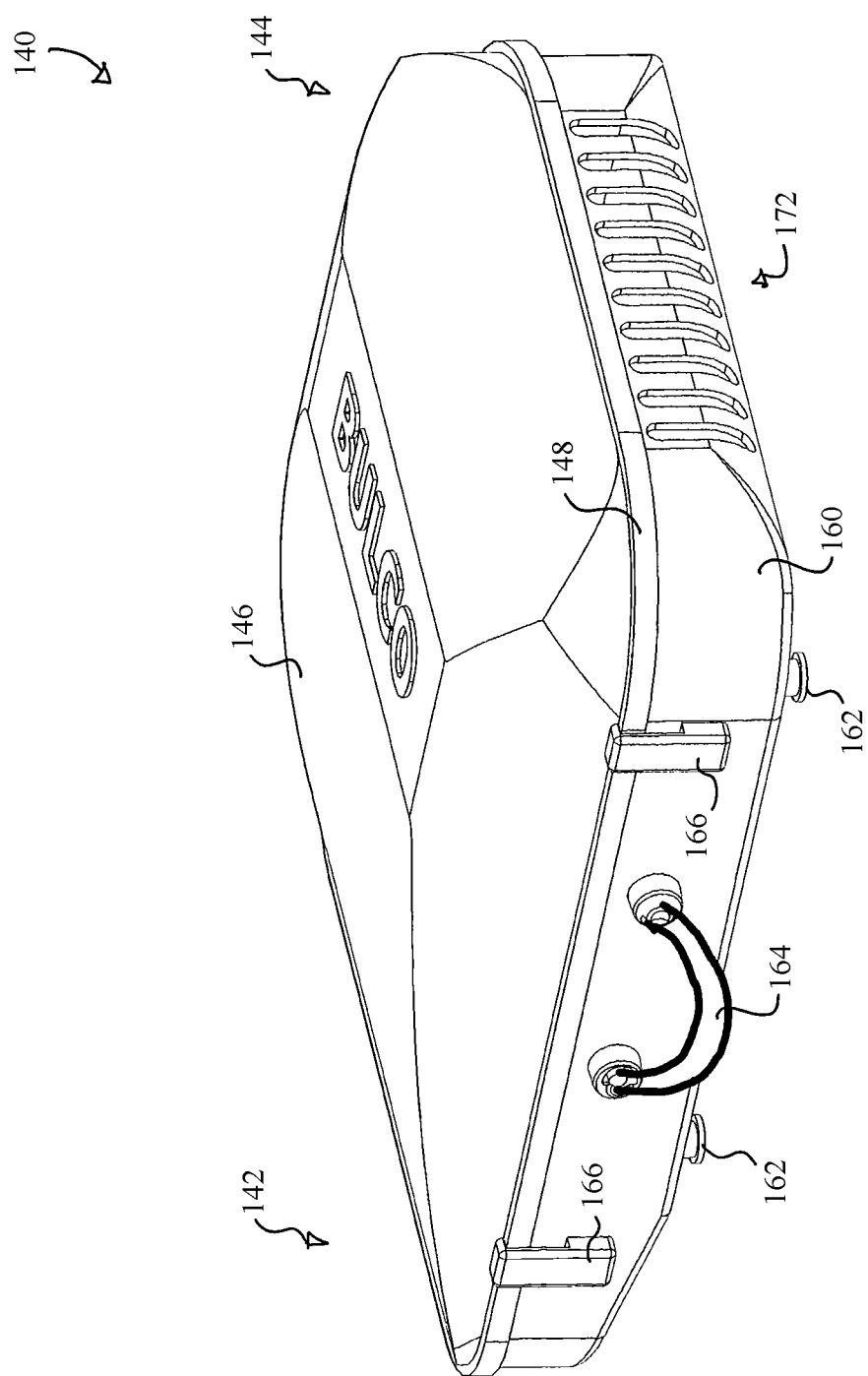
FIG. 5 depicts another perspective view of the storage assembly of FIG. 1A, where the storage assembly is in the closed configuration.

FIGS. 1A-2 show a vehicle car carrier system (100) that may be used to store items on an external portion of a vehicle (10). Vehicle car carrier system (100) includes a coupling assembly (110) and a storage assembly (140). As will be described in greater detail below, coupling assembly (110) is configured to attach to a roof (12) of vehicle (10) between a front windshield (14) and a rear windshield (16). Additionally, storage assembly (140) is configured to easily attach and detach from coupling assembly (110) such that a user may load items into storage assembly (140), attach storage assembly (140) to coupling assembly (110) for transport of items, and detach storage assembly (140) from coupling assembly (110) to unload items from storage assembly (140). As will be described in greater detail below, vehicle car carrier system (100) is configured to store items with undesirable qualities for transport, such as dampness and foul odor, and at least partially remedy the undesirable qualities of stored items during transport. Additionally, as will be described in greater detail below, storage assembly (140) contains components to help remedy the undesirable qualities from both exterior and interior surfaces of selected items.

A. Exemplary Coupling Assembly

As best seen in FIGS. 1B-3, coupling assembly includes a pair of attachment rail assemblies (112). Each attachment rail assembly (112) includes an elongate rail (114) defining a T-slot (115) extending from an open end (116) to a closed end (118), and a pair of magnets (122) coupled to each elongate rail (114) via a column (120). Magnets (122) may attach to roof (12) of vehicle (10) in order to selectively fix each attachment rail assembly (112) to vehicle (10). Any suitable magnet (122) may be used as would be apparent to one having ordinary skill in the art in view of the teachings herein. For instance, magnets (122) may include neodymium magnets, etc. In the current example two magnets (122) are attached to each elongate rail (114) via columns (120). However, any suitable number of magnets (122) and columns (120) may be used as would be apparent to one having ordinary skill in the art in view of the teachings herein. Further, while magnets (122) are used to fix attachment rail assembly (112) in the current example, any other suitable attachment means may be used to couple attachment rail assembly (112) as would be apparent to one having ordinary skill in the art in view of the teachings herein, such as a mounting assembly.

As mentioned above, elongate rails (114) each define a T-slot (115). T-slots (115) are dimensioned to slidingly receive attachment members (162) of storage assembly (140) from open end (116) toward closed end (118) such that attachment members (162), and therefore storage assembly (140), are restricted from moving in any direction except in a direction defined by the elongate path of T-slot (115). Open end (116) of T-slot (115) may include any suitable type of locking feature to prevent unwanted movement of storage assembly (140) in the direction defined by T-slot (115) during transport. As one mere example, open end (116) of T-slot (115) may contain a resiliently biased pin extending within T-slot (115) that may be biased toward a position obstructing clear access for attachment members (162) to enter or exit open end (116) of T-slot (115). The resiliently biased pin may be pressed downward to no longer obstruct access for attachment members (162) to enter or exit open end (116) when a user desires to attach or remove attachment members (162) to/from elongate rail (114). Any other suitable locking feature that would be apparent to one having ordinary skill in the art in view of the teachings herein. However, in some instances, elongate rails (114) may not include a locking feature at all, therefore making locking feature merely optional.

As mentioned above, columns (120) connect each magnet (122) to elongate rail (114). Columns (120) may include damping properties configured to absorb forces transferred from elongate rails (114) toward magnets (122) or vice versa. Therefore, forces absorbed from magnets (122) and transferred to storage assembly (140), such as due to vehicle (10) hitting a bump in the road, may be reduced.

B. Exemplary Storage Assembly

As mentioned above, and as will be described in greater detail below, vehicle car carrier system (100), particularly storage assembly (140), is configured to store items during transport as well as help remedy undesirable qualities (i.e. smelly, wet, etc.) of stored items during transport. Additionally, as will be described in greater detail below, car carrier system (100) is configured to at least partially remedy undesirable qualities of both the exterior and interior of selected items.

Figure 6A:
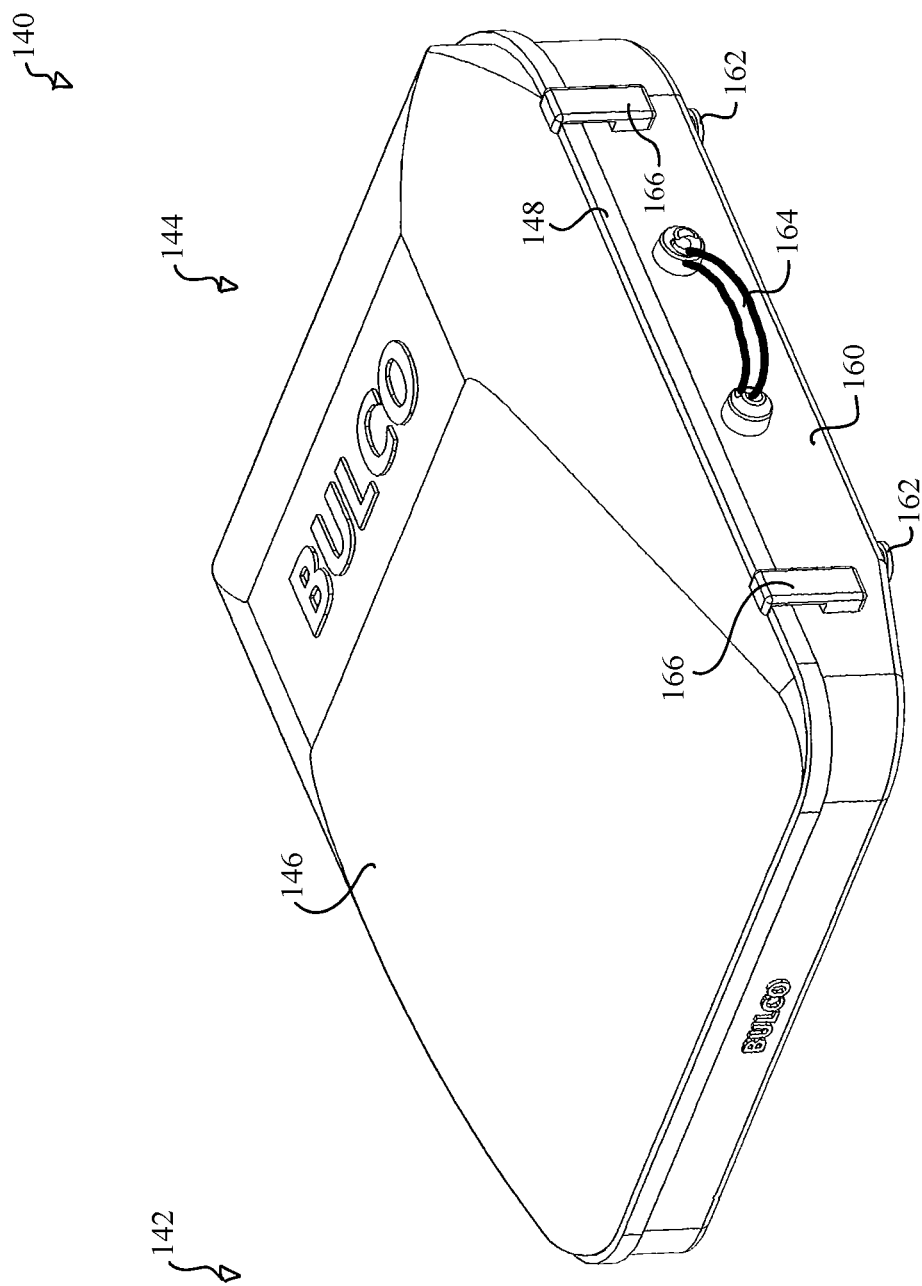
FIG. 6A depicts another perspective view of the storage assembly of FIG. 1A, where the storage assembly is in the closed configuration.
Figure 6B:
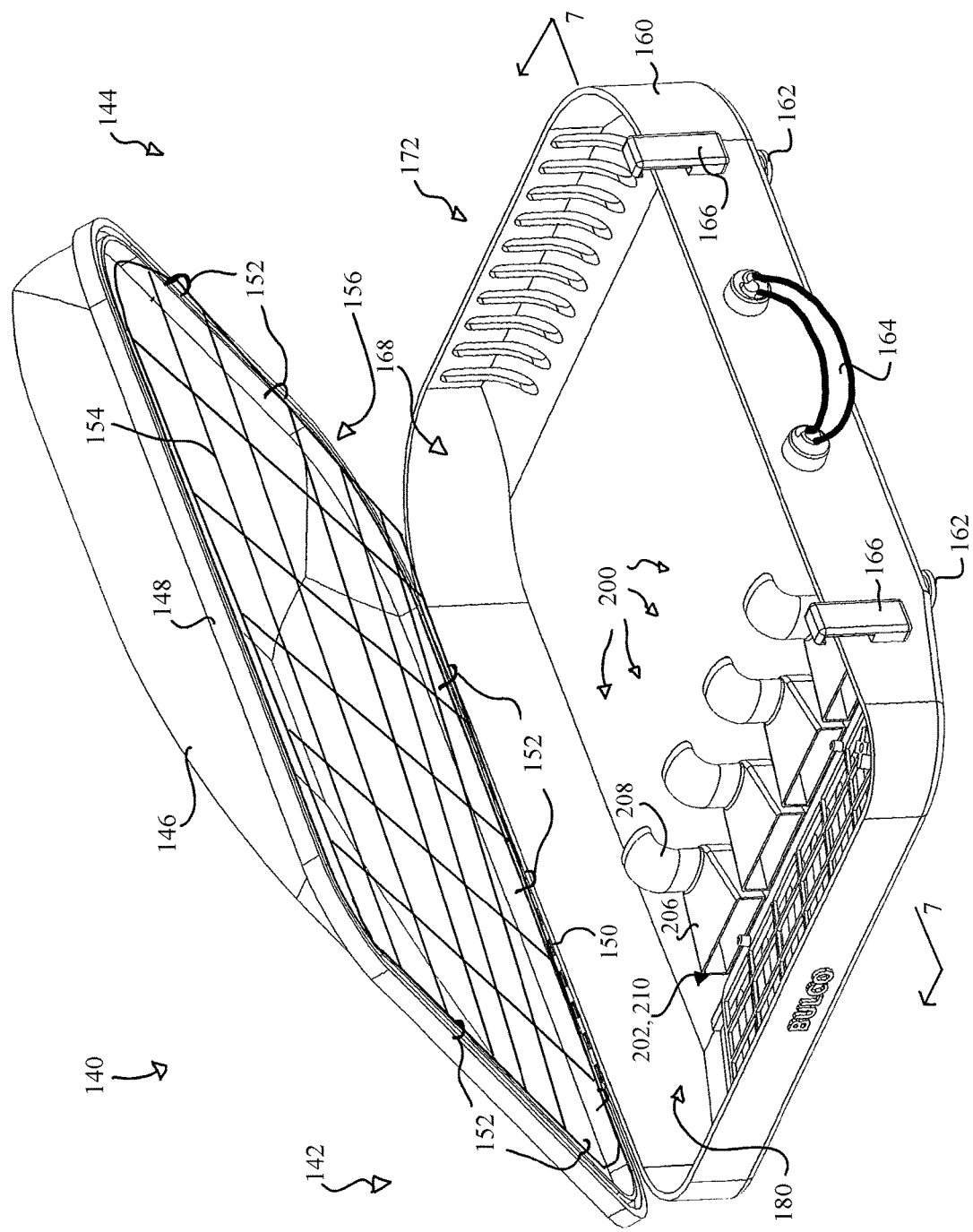
FIG. 6B depicts a perspective view of the storage assembly of FIG. 1A, where the storage assembly is in a partially opened configuration.
Figure 7:
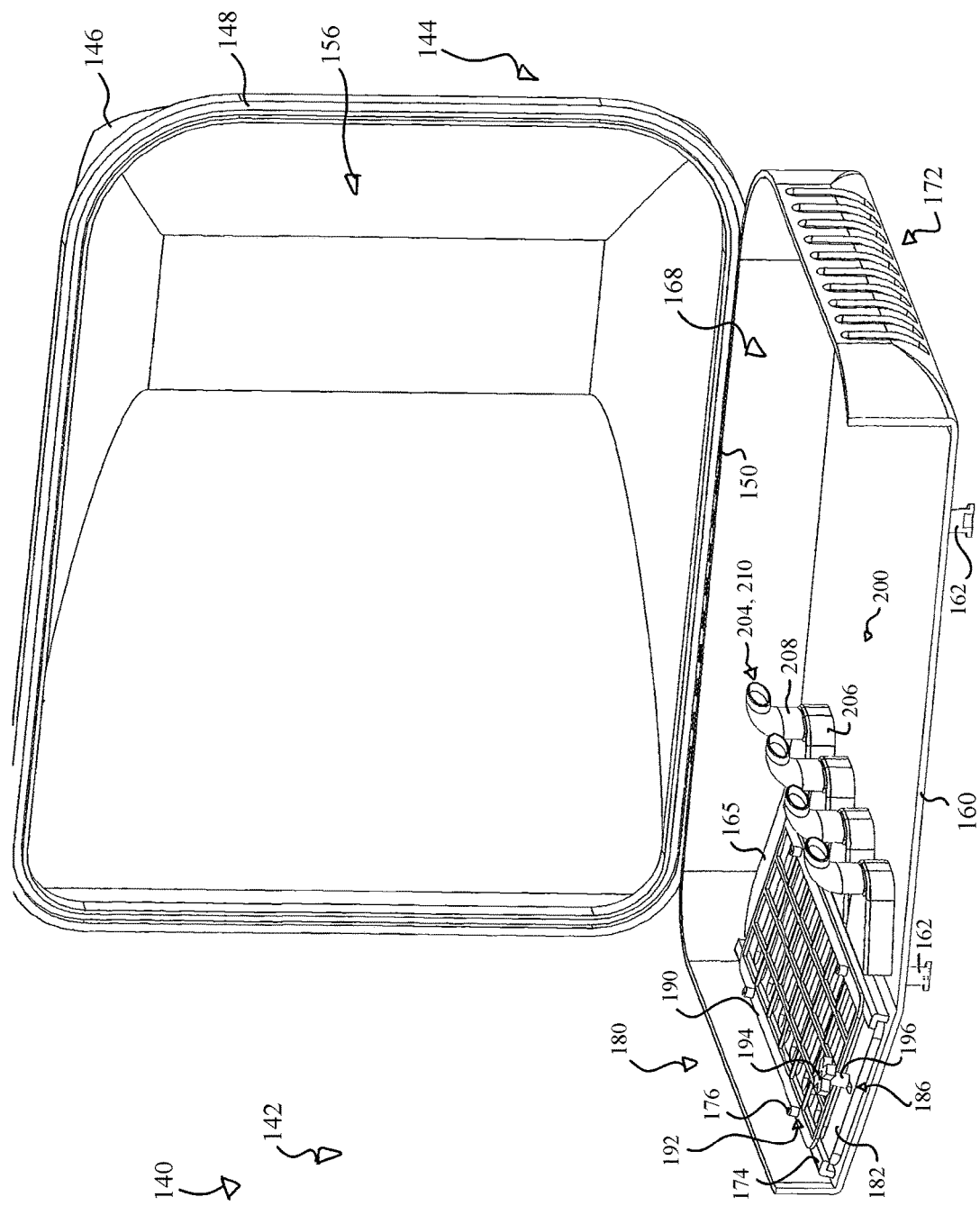
FIG. 7 depicts a cross-sectional perspective view of the storage assembly of FIG. 1A, taken along line 7-7 of FIG. 6B, where the storage assembly is in an opened configuration.

As best seen in FIGS. 4-6B, storage assembly (140) includes a top storage body (146) and a bottom storage body (160) coupled to each other in a clam shell fashion via hinge (150). Therefore, top storage body (146) is operable to transition from a closed position (as shown in FIG. 6A) to an open position (as shown in FIG. 6B) for loading and unloading of items within an interior of storage assembly (140). Storage bodies (146, 160) extend from a front portion (142) to a rear portion (144). When properly attached to vehicle (10) via coupling assembly (110), front portion (142) of storage assembly (140) faces toward front windshield (14) while rear portion (144) faces toward rear windshield (16).

Figure 13:
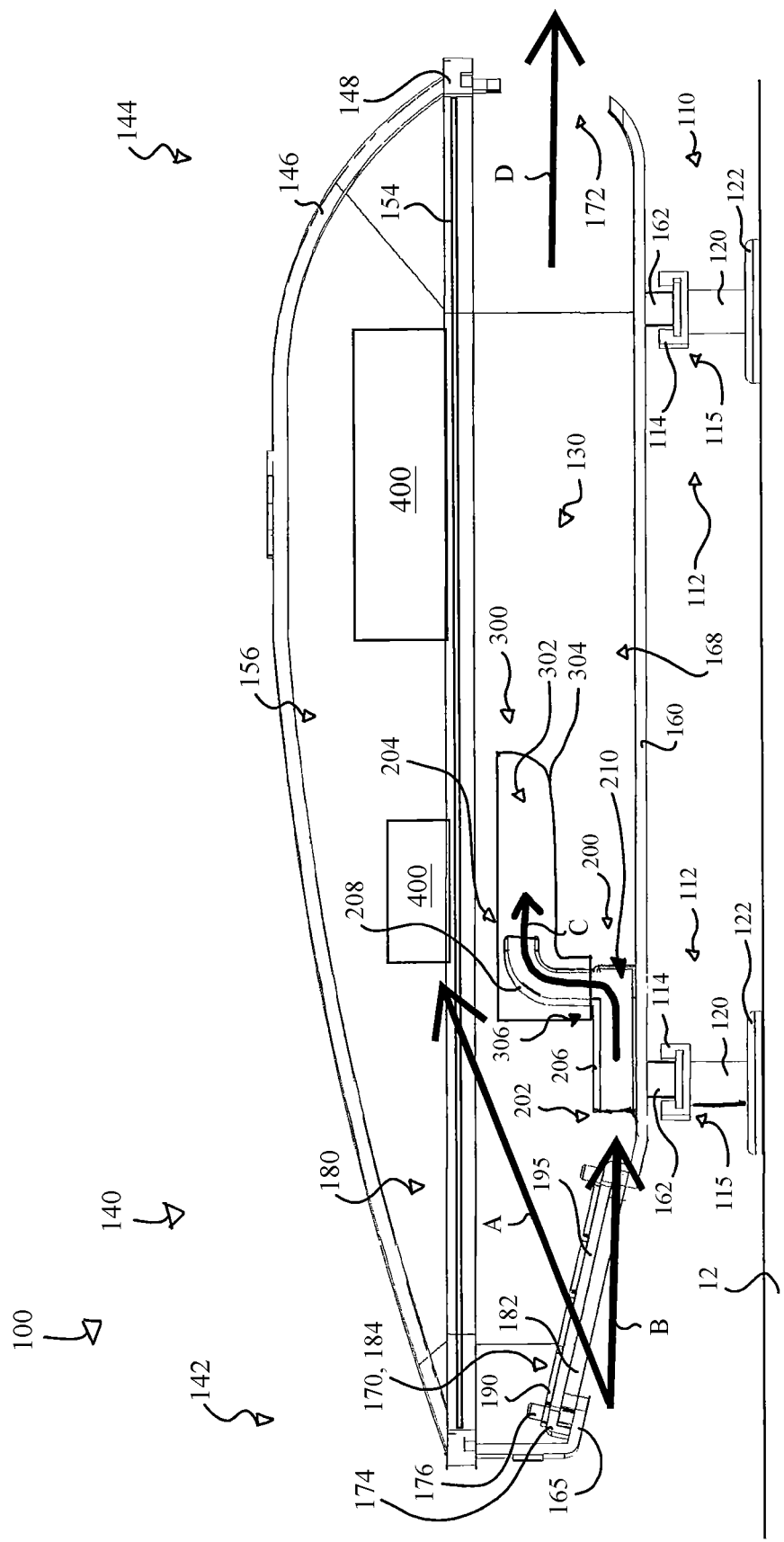
FIG. 13 depicts a cross-sectional side view of the vehicle cargo carrier system of FIG. 1A in exemplary use, taken along line 13-13 of FIG. 1A, where the coupling assembly is attached to the roof of the vehicle in FIG. 1A and the storage assembly is attached to the coupling assembly.

Top storage body (146) defines an interior cavity (156) while bottom storage member (160) also defines an interior cavity (168) such that when in the closed position, interior cavities (156, 168) cooperatively define an internal storage chamber (130) (as best seen in FIG. 13). Top storage body (146) includes a lip (148) extending around the bottom perimeter of top storage body (146). Lip (148) is configured to interface with a corresponding top perimeter of bottom storage body (160) in the closed position. Lip (148) may provide a seal between top storage body (146) and bottom storage body (160) in the closed position such that water or other fluids may not enter the interior of storage assembly (140) via interfacing portions of storage bodies (146, 160). While in the current example, top storage body (146) and bottom storage body (160) are coupled to each other in clam shell fashion to transition between the closed position and the open position, any other suitable coupling means may be used as would be apparent to one having ordinary skill in the art in view of the teachings herein. For instance, top storage body (146) may be slidably coupled with bottom storage body (160) such that top storage body (146) may slide along bottom storage body (160) from an open position to a closed position.

As best seen in FIG. 6B, top storage body (146) may include a plurality of interior hooks (152) extending from a surface defining interior cavity (156). Interior hooks (152) may be used to attach an elastic cargo net (154) to the perimeter of top storage body (146). Therefore, while interior cavities (156, 168) cooperatively define an internal storage chamber (130), elastic cargo net (154) may help segregate portions of interior cavities (156, 168) for separation of selected cargo items.

Bottom storage body (160) includes attachment members (162) extending from a bottom surface, a handle (164) extending from a side surface, a pair of closure mechanisms (166), and an inflow modification assembly (180). As described above, attachment members (162) are configured to selectively attach to coupling assembly (110). Handle (164) acts as a grip such that a user may readily control, move, or handle storage assembly (140) as desired. For instance, when a user desires to remove storage assembly (140) from coupling assembly (110) attached to roof (12), a user may grasp and pull handle (164) to slide attachment members (162) out of T-slots (115). Handle (164) may be used to conveniently carry storage assembly (140) like a suitcase. Additionally, storage assembly (140) may be lightweight and dimensioned for easy transport via handle (164), such as the size and weight of a suitcase. Of course, storage assembly (140) may have any suitable weight and dimensions that would be apparent to one having ordinary skill in the art in view of the teachings herein.

Closure mechanisms (166) are configured to selectively keep top storage body (146) in the closed position such that top storage body (146) does not accidentally open during use or during movement of vehicle (10). Closure mechanism (166) may also allow a user to selectively open top storage body (146) when desired. In the current example, closure mechanisms (166) includes a pair of resilient latches that interact with an upper surface of lip (148) to keep top storage body (146) in the closed position. When a user desires to open top storage body (146), they may flex the top portion of the latch away from lip (148), thereby allowing top storage body (146) to be opened. While in the current example, resilient latches are used, any other suitable type of closure mechanism may be used as would be apparent to one having ordinary skill in the art in view of the teachings herein.

Bottom storage body (160) includes a front facing surface (165) defining a plurality of inflow vents (170). Front facing surface (165) is located in front portion (142) of storage assembly (140) and is angled relative to the surface which attachment members (162) extend from. Front facing surface is angled and positioned such that when storage assembly (140) is properly attached to coupling assembly (110), forward movement of vehicle (10) causes air flow to pass through inflow vents (170) from an exterior of bottom storage body (160) into internal storage chamber (130). Therefore, when storage assembly (140) is loaded with items and properly attached to coupling assembly (110), forward movement of vehicle (10) may induce a stream(s) of air into internal storage chamber (130). This stream(s) of air may help dry out exterior surfaces of cargo stored in internal storage chamber (130). Drying out items may not only control odor, but may also control the growth of mildew on damp items. Any suitable geometry of inflow vents (170) or number of inflow vents (170) may be used as would be apparent to one having ordinary skill in the art in view of the teachings herein. Additionally, front facing surface (165) may have any suitable angle relative to the bottom surface of storage body (160) as would be apparent to one having ordinary skill in the art in view of the teachings herein.

Bottom storage body (160) also defines a plurality of outflow vents (172) located on rear portion (144). Outflow vents (172) are dimensioned to allow the stream(s) of air entering internal storage chamber (130) via inflow vents (170) to exit internal storage chamber (130). Outflow vents (172) may help prevent stream(s) of air entering internal storage chamber (130) from creating excessive drag forces. Outflow vents (172) may help prevent an excess buildup of pressure caused by stream(s) of air provided by inflow vents (170). Any suitable geometry of outflow vents (172) or number of outflow vents (172) may be incorporated as would be apparent to one having ordinary skill in the art.

As best seen in FIGS. 6-9D, inflow modification assembly (180) is housed within interior cavity (168) of bottom storage body (160). As will be described in greater detail below, inflow modification assembly (180) is configured to allow a user to adjust the flow rate of air passing through inflow vents (170) into internal storage chamber (130), distribute fragrant or odor eliminating particles within internal storage chamber (130), and redirect air stream(s) toward internal surfaces of selected items.

Figure 8:
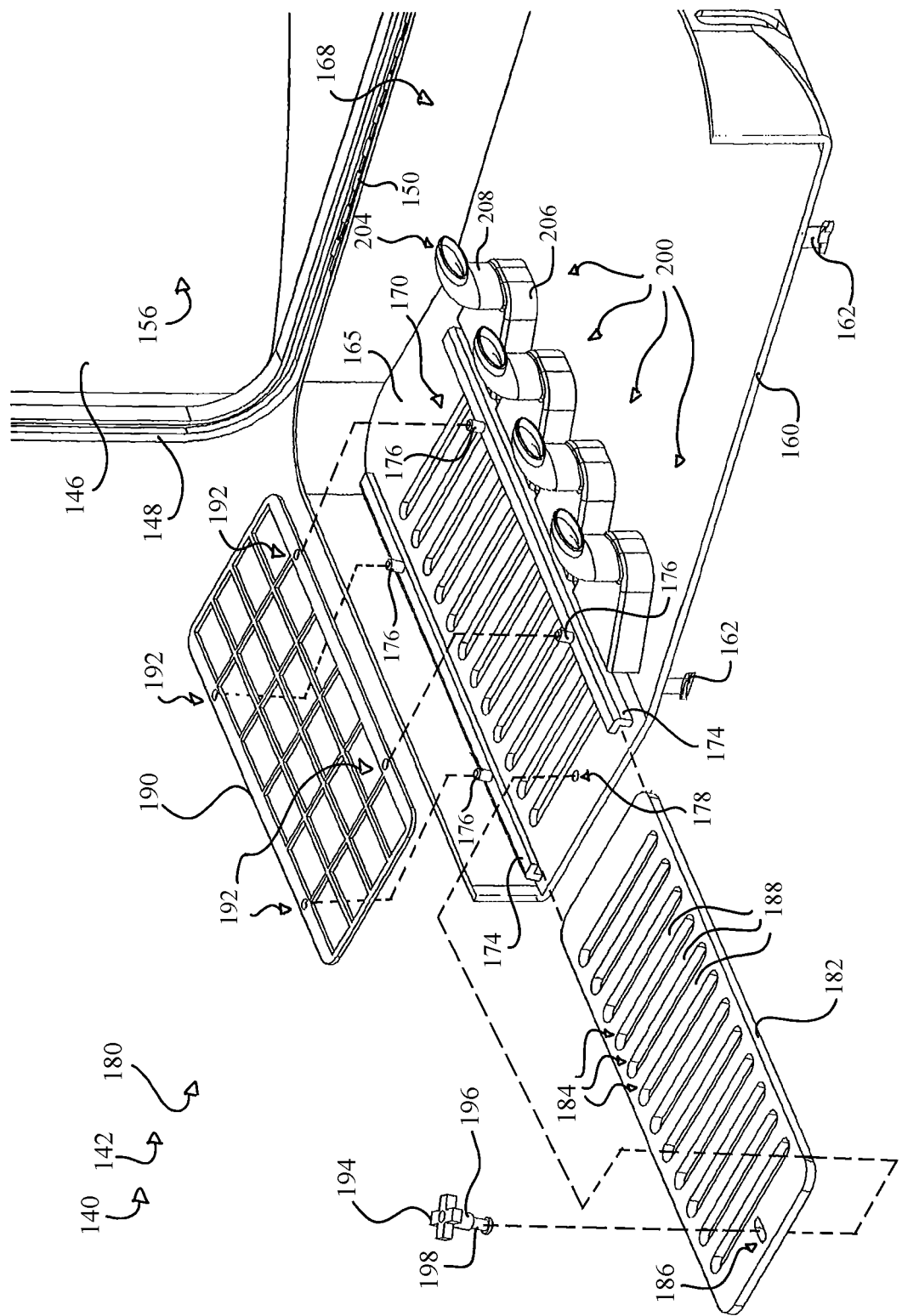
FIG. 8 depicts an exploded cross-sectional perspective view, taken long line 7-7 of FIG. 6B, where the storage assembly is in an opened configuration.

As best seen in FIG. 8, inflow modification assembly (180) includes an inflow control member (182) slidably disposed within a pair of guide members (174) extending inwardly from surface (165), a freshener screen (190) removably attached to guide members (174), a locking mechanism (194) configured to selectively fix inflow control member (182) relative to surface (165), and a plurality of fluid redirection members (200).

Inflow control member (182) is configured to allow a user to adjust the flow rate of air passing through inflow vents (170) into internal storage chamber (130). In some instances, it may be desirable to prevent air from passing through inflow vents (170) into internal storage chamber (130). For instance, if it is storming outside, it may be beneficial to prevent air and rain from passing through inflow vents (170) in order to prevent water from entering into internal storage chamber (130). As will be described in greater detail below, inflow control member (182) may slide, along a path defined by guide members (174), relative to surface (165) defining inflow vents (170) to a position that completely occludes inflow vents (170), thereby preventing substantially all air stream(s) from passing through inflow vents (170). Additionally, inflow control member (182) may slide, along the path defined by guide members (174), relative to surface (165) defining inflow vents (170) to a position that partially occludes inflow vents (170) or to a position that un-obstructs inflow vents (170).

Inflow control member (182) includes a plurality of inflow restricting members (188) that define corresponding inflow vents (184). Corresponding inflow vents (184) are dimensioned with a geometry substantially similar to inflow vents (170) defined by surface (165), however, this is merely optional. Restricting members (188) are dimensioned to occlude inflow vents (170) when restricting members (188) are directly adjacent to inflow vents (170). Conversely, corresponding inflow vents (184) are dimensioned to align with inflow vents (170) when directly adjacent to each other, thereby providing an un-obstructed fluid pathway from an external portion of bottom storage body (160) to internal storage chamber (130). In other words, inflow control member (182) may slide between a position that prevents fluid from passing through inflow vents (170) into internal storage chamber (130) and a position that allows fluid to pass through inflow vents (170) and corresponding inflow vent (184) into internal storage chamber (130).

Inflow control member (182) also defines a slot (186). Slot is dimensioned to receive a portion of locking mechanism (194) such that locking mechanism (194) may selectively fix the position of inflow control member (182) along the path defined by guide members (174). Therefore, locking mechanism (194) may help fix the position of inflow control member (182) to either occlude inflow vents (170), partially occlude inflow vents (170), or un-obstruct inflow vents (170). Locking mechanism (194) includes a shoulder member (196) unitarily connected to a threaded shaft (198). Threaded shaft (198) is dimensioned to extend through slot (186) and within a threaded cavity (178) defined by surface (165). Threaded shaft (198) complements threaded cavity (178) such that rotation of threaded shaft (198) causes linear movement of threaded shaft (198) and shoulder member (196) relative to surface (165).

Shoulder member (196) is connected to threaded shaft (198) to extend above slot (186). Shoulder member (196) may translate relative to inflow control member (182) in response to rotation of threaded shaft (196). Therefore, shoulder member (196) may abut against a portion of inflow control member (182) defining slot (186) when threaded shaft (198) is rotated to translate within threaded cavity (178) toward an exterior of surface (165). Shoulder member (196) may abut against inflow control member (182) to provide a frictional braking force between inflow control member (182) and surface (165) that prevents inflow control member (182) from sliding along guide members (174).

Conversely, shoulder member (196) may extend away from the portion of inflow control member (182) defining slot (186) when threaded shaft (198) is rotated to translate within cavity (198) toward an interior of surface (165). When shoulder member (196) does not abut against inflow control member (182), no or minimal fictional braking force is provided between inflow control member (182) and surface (165) such that inflow control member (182) may slide along guide members (174). Therefore, threaded shaft (198) may rotate such that shoulder member (196) prevents or allows movement of inflow control member (182) along guide members (174).

Figure 9A:
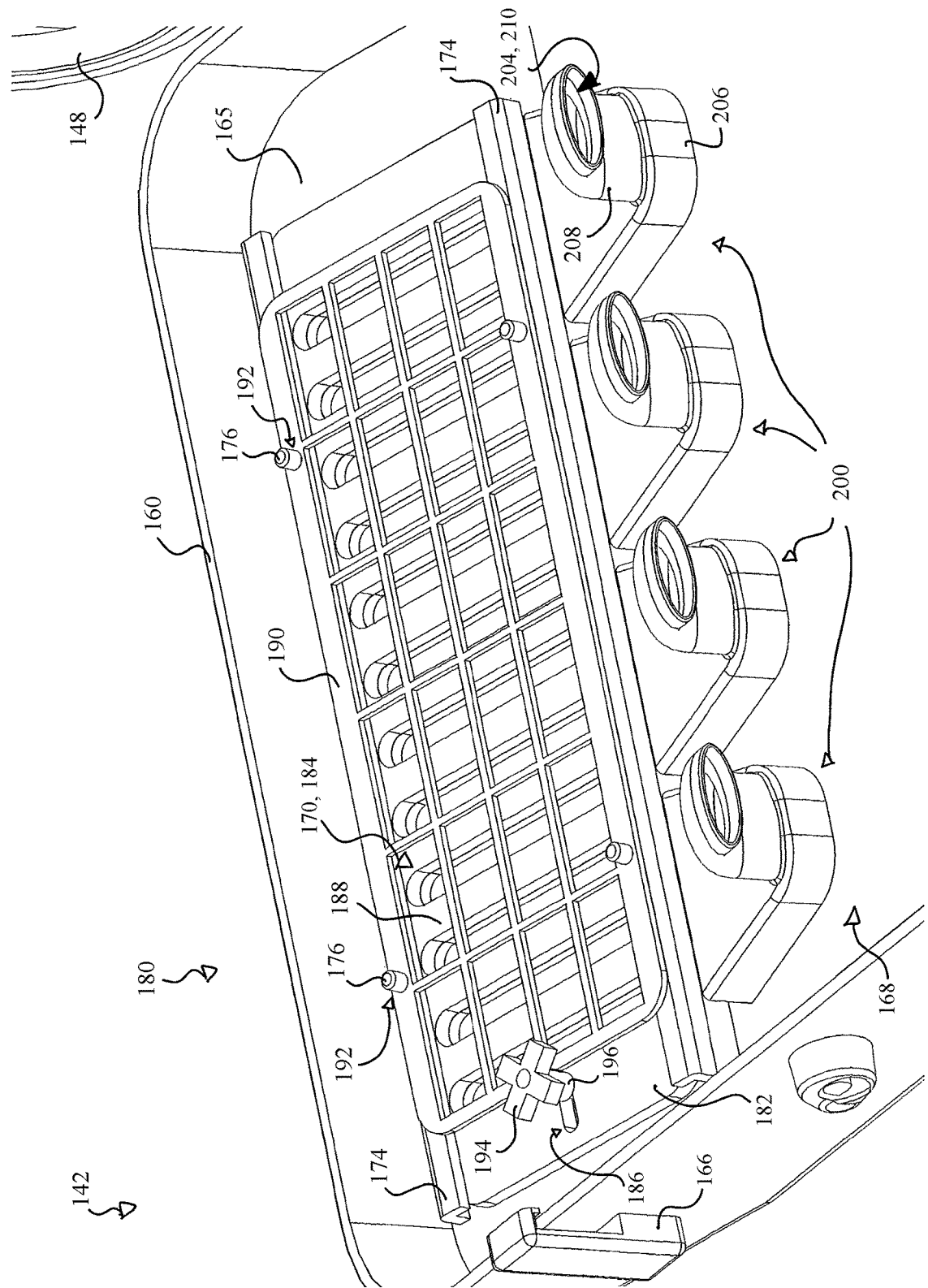
FIG. 9A depicts a perspective view of an inflow modification assembly of the storage assembly of FIG. 1A, where an inflow control member is in a locked and opened configuration.

FIGS. 9A-9D show exemplary use of inflow control member (182) and locking mechanism (194) to selectively occlude inflow vents (170). FIG. 9A shows inflow control member (182) in a first position such that inflow vents (170) and corresponding inflow vents (184) are adjacent to each other. At this point, air stream(s) may flow from an exterior of bottom storage body (160), through inflow vents (170, 184), and into internal storage chamber (130) during exemplary use. Additionally, locking mechanism (194) is in a locked position such that shoulder member (196) provides a frictional braking force preventing inflow control member (182) from sliding along the path defined by guide members (174).

Figure 9B:
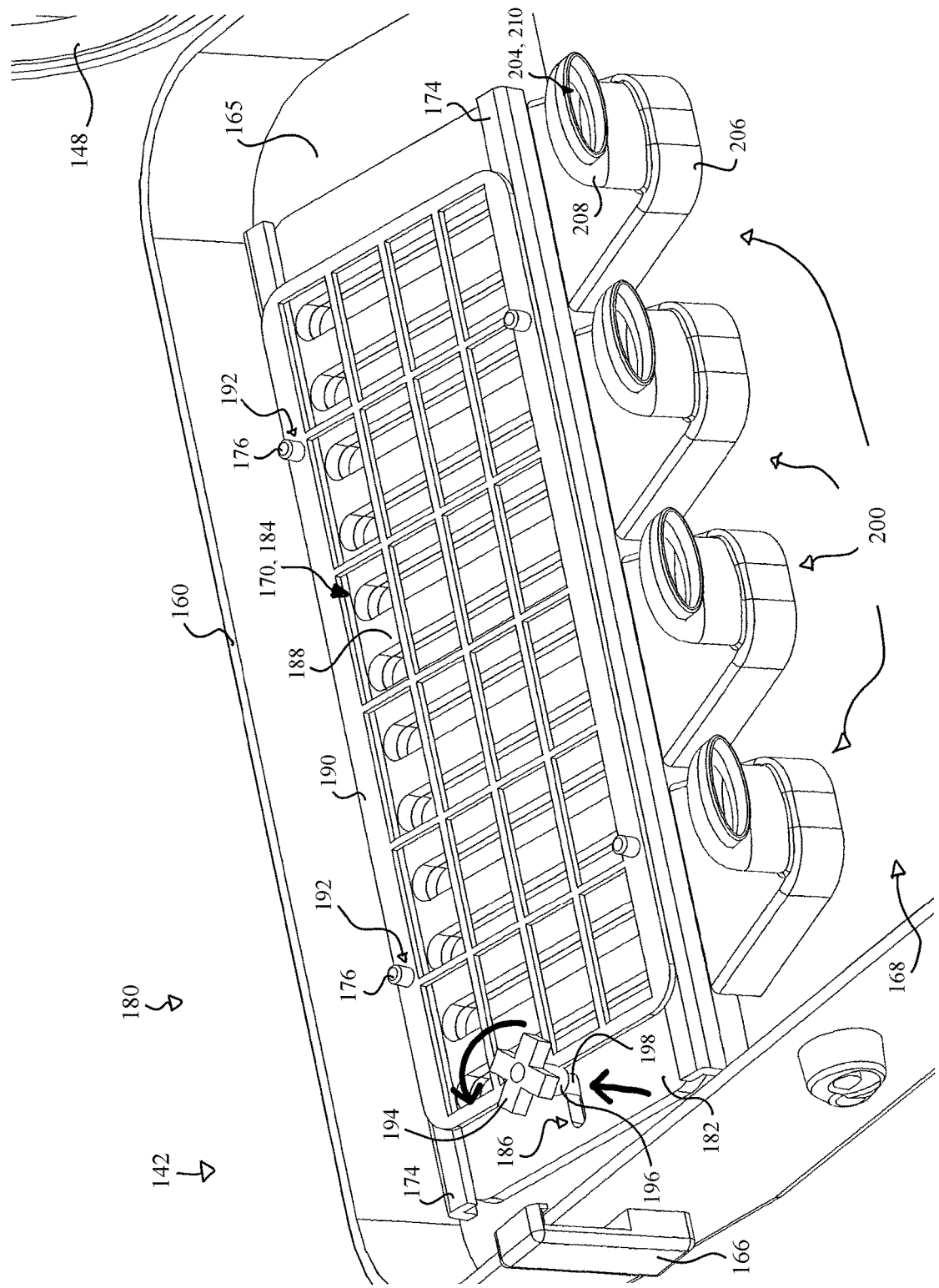
FIG. 9B depicts a perspective view of the inflow modification assembly of FIG. 9A, where the inflow control member is in an unlocked and opened configuration.
Figure 9C:
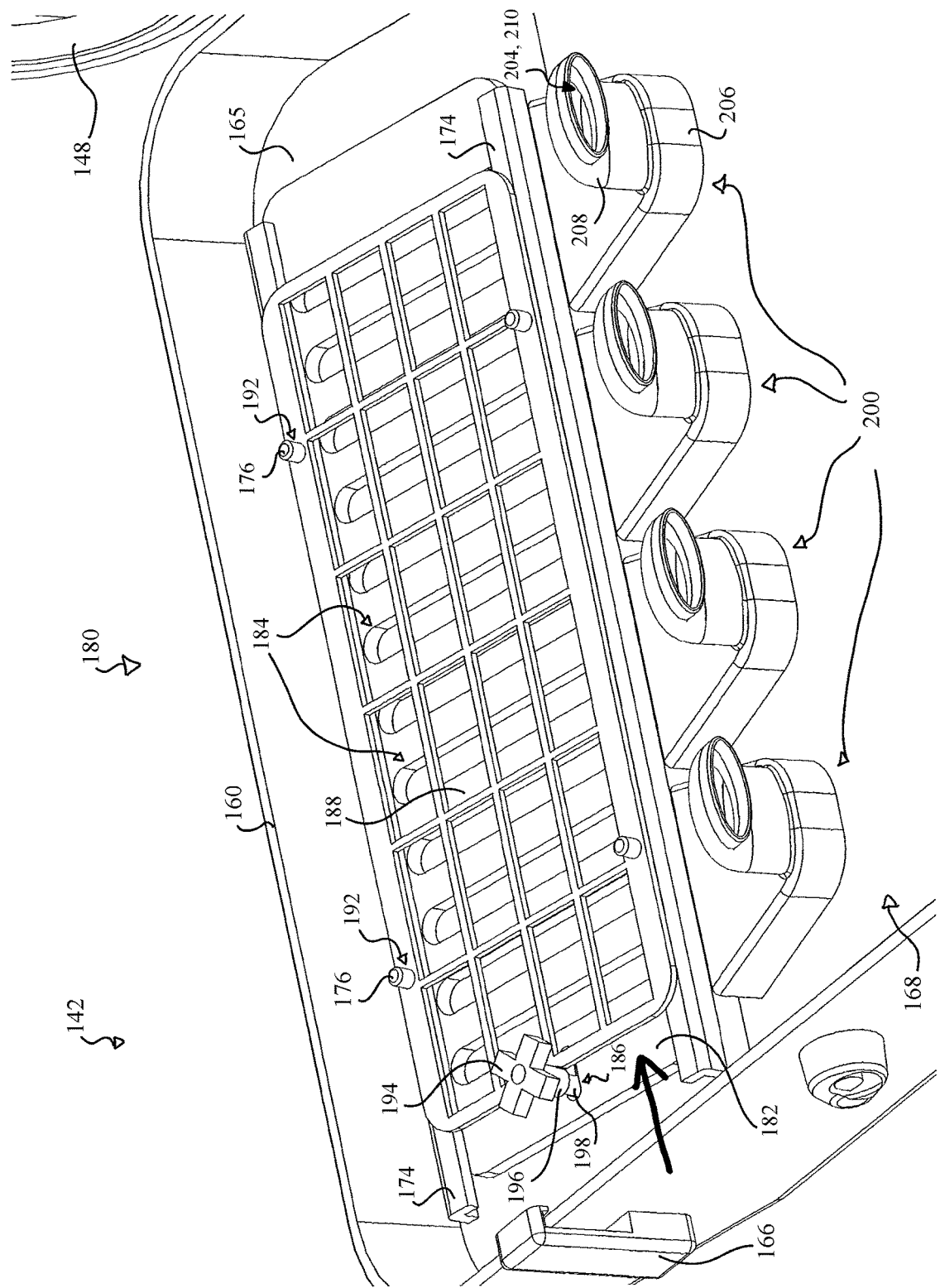
FIG. 9C depicts a perspective view of the inflow modification assembly of FIG. 9A, where the inflow control member is in an unlocked and closed configuration.
Figure 9D:
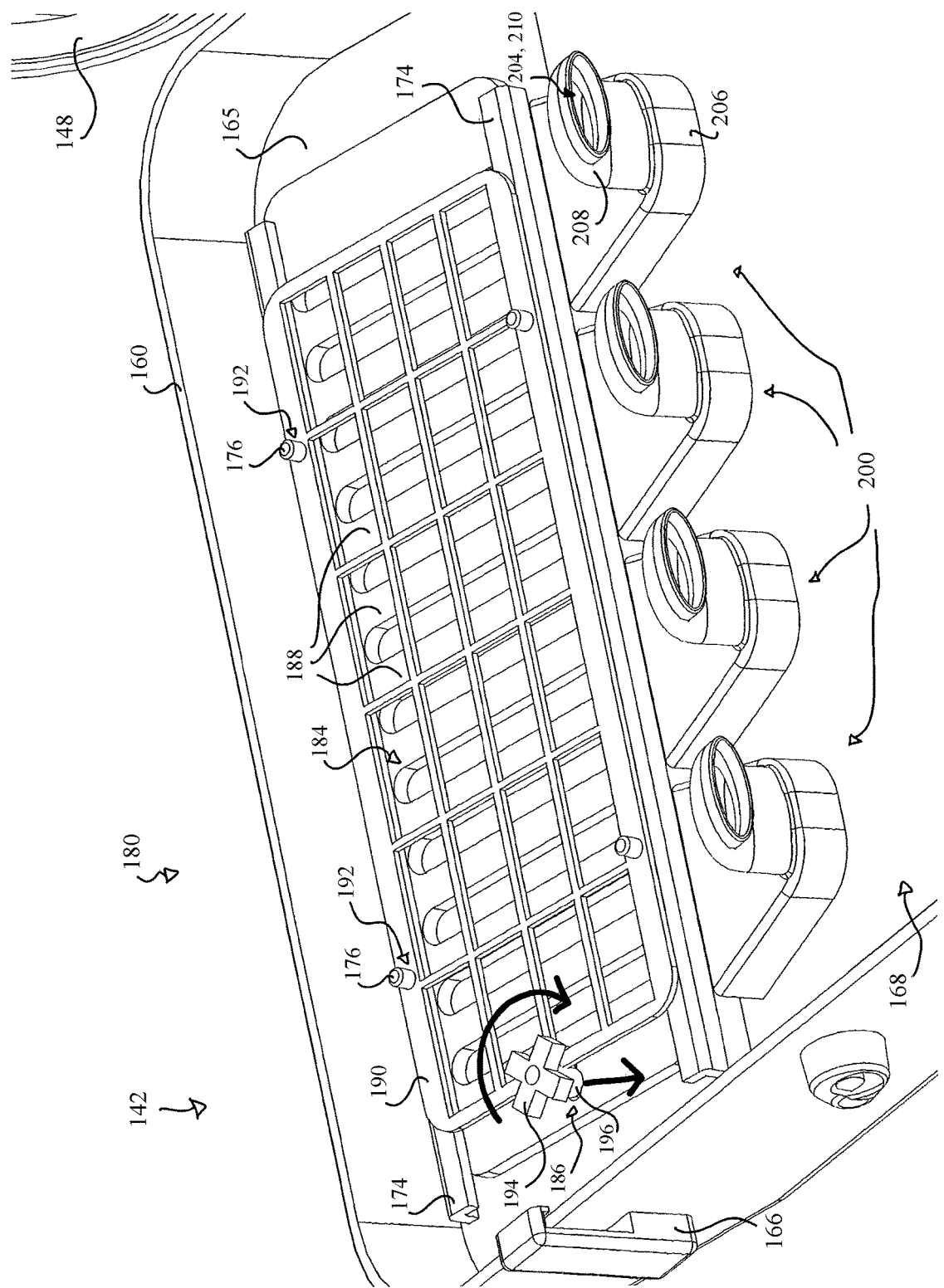
FIG. 9D depicts a perspective view of the inflow modification assembly of FIG. 9A, where the inflow control member is in a locked and closed configuration.

If a user desires to move inflow control member (182) to completely or partially occlude inflow vent (170), they may first rotate locking mechanism (194) counter clockwise (when viewed from above) such that threaded shaft (198) and shoulder member (196) translate upward, as shown in FIG. 9B. At this point, shoulder member (196) no longer provides a fictional braking force. Therefore, as shown between FIGS. 9B-9C, inflow control member (182) may be translated along the path defined by guide members (174). In particular, inflow control member (182) is translated to a position where inflow restricting member (188) are adjacent to inflow vents (170), thereby occluding inflow vents (170). With inflow control member (182) in its desired location, a user may then rotate locking mechanism (192) clockwise (when viewed from above) such that threaded shaft (198) and shoulder member (196) translate downward, as shown in FIG. 9D. As this point, locking mechanism (194) is back in the locked position such that shoulder member (196) provides a frictional braking force preventing inflow control member (182) from sliding along the path defined by guide members (174). If a user desires to move inflow control member (182) back to the position shown in FIG. 9A, they may follow the steps described above in reverse order.

As mentioned above, inflow modification assembly (180) is configured to allow a user to distribute fragrant or odor eliminating particles (e.g. odor absorbing particles) within internal storage chamber (130) during exemplary use. Therefore, while inflow vents (170) allow air stream(s) to enter internal storage chamber (130) to dry items, inflow modification assembly (180) may allow air streams(s) to carry and distribute fragrant or odor eliminating particles simultaneously to help reduce or eliminate unwanted odors.

Freshener screen (190) is configured to selectively attach a fragrant or odor eliminating/absorbing sheet or material to inflow modification assembly (180), such as a dryer sheet or any other suitable material that would be apparent to one having ordinary skill in the art in view of the teachings herein. Freshener screen (190) includes a matrix frame structure defining a plurality of apertures between. Apertures allow air stream(s) to pass through freshener screen (190). As best seen in FIG. 13, freshener screen (190) may attach a fragrant or odor eliminating/absorbing sheet (195) directly adjacent to inflow vents (170, 184). As air stream(s) pass through inflow vents (170, 184) into internal storage chamber (130) during exemplary use, air stream(s) also pass through fragrant or odor eliminating sheet (195), and carry particles from sheet (195) into internal storage chamber (130). Therefore, air stream(s) may assist in carrying fragrant or odor eliminating/absorbing particles toward cargo when sheet (195) is operatively attached via freshener screen (190).

Freshener screen (190) also defines a plurality of coupling features (192). As mentioned above, freshener screen (190) is removably attached to guide members (174). In particular, a plurality of coupling features (176) extend upwardly from guide members (174) that are configured to selectively couple with freshener screen (190) such that freshener screen (190) may be removed when desired. In the present case, coupling features (176) are bosses while coupling features (192) of freshener screen (190) are holes configured to be inserted over bosses. Bosses and holes may have an interference or snap fitting relationship such that when inserted into each other, frictional forces keep freshener screen (190) and guide member (174) attached. If a user wishes to decouple freshener screen (190) with guide members (174), they may pull freshener screen (190) away from guide members (174) to overcome the frictional force and remove freshener screen (190). While the current example uses bosses and holes as coupling features (176, 192), any other suitable means may be used as would be apparent to one having ordinary skill in the art in view of the teachings herein.

Figure 10:
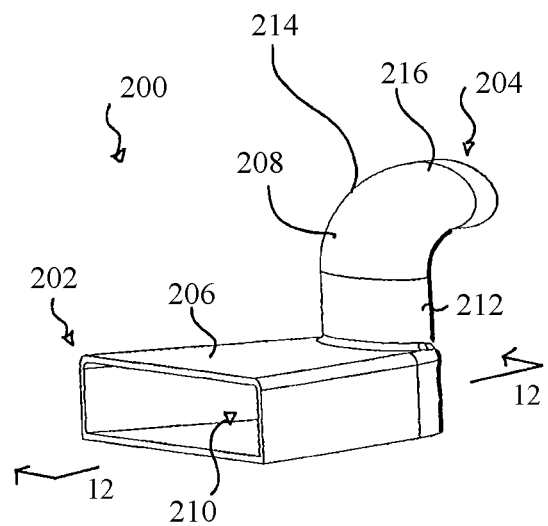
FIG. 10 depicts a perspective view of a fluid redirection member of the inflow modification assembly of FIG. 9A.
Figure 11:
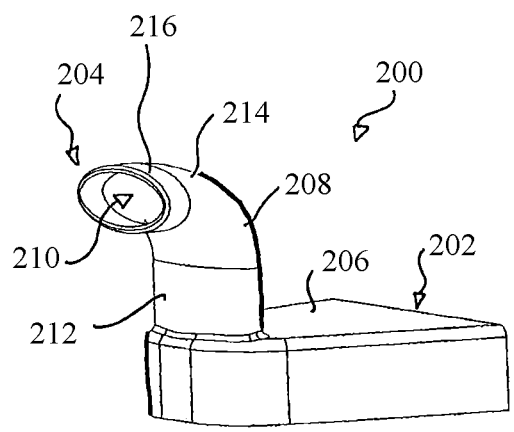
FIG. 11 depicts another perspective view of the fluid redirection member of FIG. 10.
Figure 12:
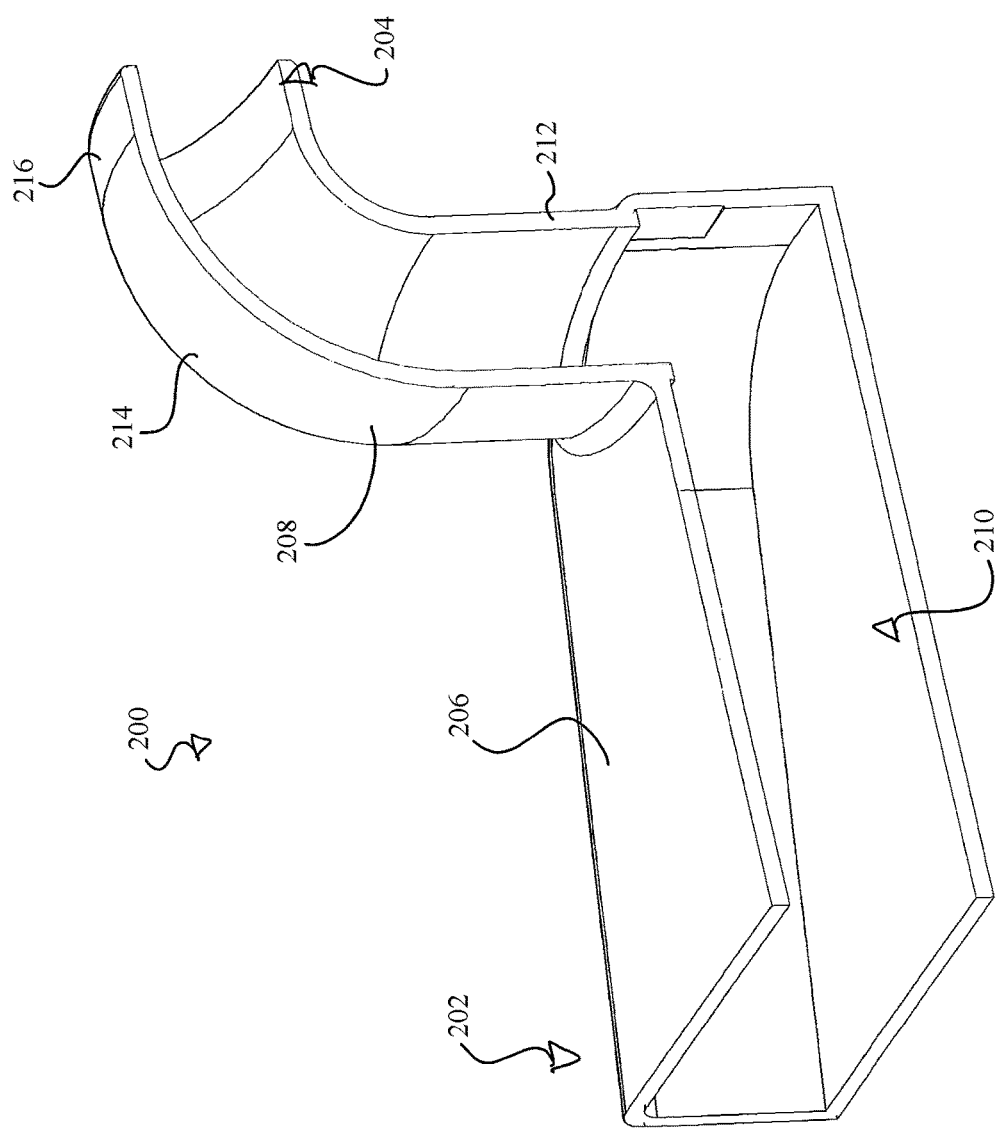
FIG. 12 depicts a cross-sectional perspective view of the fluid redirection member of FIG. 10, taken along line 12-12 of FIG. 10.

As also mentioned above, it may be desirable to dry an item as well as remove the odor from an interior surface as well as an exterior surface. However, during exemplary use, inflow vents (170, 184) may only provide air stream(s) that access exterior surfaces of items. As will be described in greater detail below, fluid redirection members (200) are configured to take air stream(s) from inflow vents (170, 184), and redirect those air stream(s) toward an interior surface of selected items. As best seen in FIGS. 10-12, fluid redirection members (200) include a base (206) connected to an insertable extension (208). As best seen in FIGS. 6B-8, base (206) is attached to the interior floor of bottom storage body (160). Base (206) may be fixed to the interior floor of bottom storage body (160) by any suitable means that would be apparent to one having ordinary skill in the art in view of the teachings herein. For example, base (206) may be fixed to the interior floor through use of adhesives.

While in the current example, base (206) is fixed to the interior floor of bottom storage body (160), this is merely optional. Base (206) may be selectively attachable to the interior floor such that fluid redirection members (200) are removable and replaceable. For instance, base (206) may include an L-shaped coupling hook extending from its exterior bottom, while the bottom interior floor may include a complementary L-shaped slot. Fluid redirection members (200) may be selectively attached via the L-shaped slot and L-shaped coupling hook. Further, fluid redirection member (200) may be slidably attached such that base (206) may be repositioned along any suitable direction of the bottom interior floor. For instance, the L-shaped slot may extend across the bottom interior floor such that bases (206) may slide relative to each other. Of course, any suitable means and configurations used to make fluid redirection members (200) removable, replaceable, or repositionable will be apparent to those having ordinary skill in the art in view of the teachings herein.

Base (206) defines a first open end (202) and a portion of a fluid pathway (210). Additionally, insertable extension (208) defines a second open end (204) and another portion of fluid pathway (210). Therefore, first open end (202) of base (206) is in fluid communication with second open end (204) of insertable extension (208) via fluid pathway (210). First open end (202) is positioned adjacent to inflow vents (170, 184) such that at least a portion of air stream(s) traveling through inflow vents (170, 184) into internal storage chamber (130) during exemplary use may enter into first open end (202). Because first open end (202) is in fluid communication with second open end (204) via fluid pathway (210), air stream(s) traveling through first open end (202) may be redirected toward and out of second open end (204) of insertable extension (208).

Insertable extension (208) includes a vertical portion (212) extending upwardly from base (206), an arched portion (214) extending from vertical portion (212), and a longitudinal portion (216) extending from arched portion (214) and away from base (206). Longitudinal portion (216) terminates into second open end (204). Therefore, the geometry of insertable extension (208) partially defines fluid pathway (210). In other words, the geometry of insertable extension (208) may redirect air flow that enters through first open end (202).

As best seen in FIG. 13, insertable extension (208) of the present example is dimensioned to be inserted into, as well as partially or entirely support, a shoe (300). Open second end (204) of insertable extension (208) extends into an interior (302) of shoe (300). Therefore, open second end (204) may take redirected air flow traveling through fluid pathway (210) and direct the air flow into interior (302) of shoe (300). In other words, when insertable extension (208) is inserted into interior (302) of shoe (300), at least some air stream(s) may travel through inflow vents (170, 184), into first open end (202), redirected through fluid pathway (210), out of second open end (204), and toward interior (302) of shoe (300). Fluid redirection member (200) therefore provides fluid communication between inflow vents (170, 184) and interior (302) of shoe (300).

While in the current example, insertable extension (208) is dimensioned to be inserted into and support shoe (300), insertable extension (208) may include various geometries and properties to provide fluid communication between inflow vents (170, 184) and interior portions of various items that would be apparent to one having ordinary skill in the art in view of the teachings herein. Additionally or alternatively, while insertable extension (208) only provides fluid communication to interior (302) of shoe (300) via second open end (204), insertable extension (208) may have various apertures along the profile of insertable extension (208) to provide additional fluid communication to interior sections of various items. Insertable extension (208) may be rigid, resiliently flexible, moldable, easily deformable, etc.

While the current example shows inflow modification assembly (180) entirely housed within interior cavity (168), it should be understood that selected portions of inflow modification assembly (180) may be located on the exterior of bottom storage body (160), such as freshener screen (190), guide members (174), inflow control member (182), and/or locking mechanism (194).

C. Exemplary Use of Vehicle Car Carrier System

FIG. 13 shows an exemplary use of vehicle cargo carrier system (100) while attached to roof (12) of vehicle (10). Attachment rails assemblies (112) of coupling assembly (110) are attached to roof (12) of vehicle (10) via magnets (122). Storage assembly (140) is attached to coupling assembly (110) via T-Slots (115) and attachment members (162). Therefore, storage assembly (140) is properly attached to roof (12) of vehicle (10).

It should be understood that inflow vents (170, 184) are open such that air stream(s) may travel through inflow vents (170, 184) into interior storage chamber (130). Fragrant or odor eliminating/absorbing sheet (195) is housed between freshener screen (190) and inflow control member (182) in accordance with the description above. Therefore, air streams (A, B) entering through inflow vents (170, 184) into interior storage chamber (130) may also carry fragrant or odor eliminating particles from sheet (195).

Shoe (300) is attached to fluid redirection member (200) in accordance with the description above. Therefore, insertable extension (208) is inserted into an opening (306) of shoe (300) such that open second end (204) is located within interior (302) of shoe (300). Additionally, other cargo items (400) are stored within interior cavity (156) of top storage body (146) while resting on elastic cargo net (154).

FIG. 13 shows vehicle cargo carrier system (100) attached to roof (12) while vehicle (10) is traveling forward. Since vehicle (10) is traveling forward, air streams (A, B) enter from an exterior of storage assembly (140) through inflow vents (170, 184), through fragrant or odor eliminating sheet (195), and into internal storage chamber (130). As also seen, air stream (D) may exit storage assembly (140) via outflow vents (174).

Air stream (A) is directed away from first open end (202) of fluid redirection member (200). Therefore, air stream (A) may make contact with exterior surfaces of cargo (400) and exterior (304) of shoe (300). Air stream (A) may therefore help dry and eliminate foul odor from an exterior of cargo (400) and exterior (304) of shoe (300) through contact.

However, air stream (B) is directed toward first open end (202) of fluid redirection member (200). Therefore, air stream (B) may travel into fluid pathway (210) and be redirected into air stream (C) such that air stream (C) exits second open end (204) and makes contact with interior (302) of shoe (300). Therefore, vehicle cargo carrier system (100) may help dry and eliminate foul odors on both exterior (304) and interior (302) of shoe (300). As also seen, air stream (D) may exit storage assembly (140) via outflow vents (174).

II. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A vehicle cargo carrier the vehicle cargo carrier comprising: (a) a coupling assembly configured to selectively attach to a vehicle; and (b) a storage assembly configured to selectively attach to the coupling assembly such that the storage assembly is operative attached to the vehicle, the storage assembly comprising: (i) a first storage body, wherein the first storage body defines an inflow vent configured to receive a fluid from an exterior of the first storage body to an interior of the first storage body, (ii) a second storage body, wherein the first storage body is configured to move relative to the second storage body from a closed position to an open position, wherein the first storage body and the second storage body define an internal storage chamber while the first storage body is in the closed position, and (iii) a fluid redirection member, wherein the fluid redirection member comprises: (A) a base attached to either the interior of the first storage body or an interior of the second storage body, wherein the base defines a first open end configured to receive a portion of the fluid from the inflow vent, and (B) an insertable extension defining a second open end, wherein the second open end and the first open end are in fluid communication.

Example 2

The vehicle cargo carrier of Example 1, wherein the first storage body defines an outflow vent located on a first end, wherein the inflow vent is located on a second end, wherein the first end and the second end are on opposite sides of the first storage body.

Example 3

The vehicle cargo carrier of any one or more of Examples 1 through 2, wherein the storage assembly further comprises an inflow control member, wherein the inflow control member is configured to selectively limit the fluid from entering the interior of the first storage body.

Example 4

The vehicle cargo carrier of Example 3, wherein the inflow control member is slidable relative to the inflow vent.

Example 5

The vehicle cargo carrier of any one or more of Examples 1 through 4, further comprising a freshener screen that is selectively attachable to the first storage body.

Example 6

The vehicle cargo carrier of Example 5, wherein the freshener screen is configured to abut an odor eliminating sheet between the input vent and the fluid redirection member.

Example 7

The vehicle cargo carrier of any one or more of Examples 1 through 6, wherein the insertable extension is configured to fit within an interior of a shoe.

Example 8

The vehicle cargo carrier of any one or more of Examples 1 through 7, wherein the insertable extension is rigid.

Example 9

The vehicle cargo carrier of any one or more of Examples 1 through 7, wherein the insertable extension is resilient.

Example 10

The vehicle cargo carrier of any one or more of Examples 1 through 7, wherein the insertable extension is moldable.

Example 11

The vehicle cargo carrier of any one or more of Examples 1 through 10, wherein the base is attached to either the interior of the first storage body of the interior or the second storage body via an adhesive.

Example 12

The vehicle cargo carrier of any one or more of Examples 1 through 10, wherein the base is removably attached to either the interior of the first storage body or the interior of the second storage body.

Example 13

The vehicle cargo carrier of Example 12, wherein the base is removably attached via an L-shaped coupling hook.

Example 14

The vehicle cargo carrier of any one or more of Examples 1 through 13, wherein the first storage body and the second storage body are coupled via a hinge.

Example 15

The vehicle cargo carrier of any one or more of Example 1 through 14, wherein the coupling assembly comprises a magnet.

Example 16

The vehicle cargo carrier of any one or more of Examples 1 through 15, wherein the coupling assembly comprises an elongated rail defining a T-slot.

Example 17

The vehicle cargo carrier of Example 16, wherein the T-slot of the elongated rail has an open end and a closed end.

Example 18

The vehicle cargo carrier of either one or more of Examples 1 through 17, wherein the base is repositionable.

Example 19

A vehicle cargo carrier, the vehicle cargo carrier comprising: (a) a coupling assembly configured to selectively attach to a vehicle; and (b) a storage assembly configured to selectively attach to the coupling assembly such that the storage assembly is operative attached to the vehicle, the storage assembly comprising: (i) a first storage body, wherein the first storage body defines an inflow vent configured to receive an air stream from an exterior of the first storage body to an interior of the first storage body, (ii) a second storage body, wherein the first storage body is configured to move relative to the second storage body from a closed position to an open position, wherein the first storage body and the second storage body define an internal storage chamber while the first storage body is in the closed position, and (iii) a freshener screen configured to selective attach a freshener element adjacent to the inflow vent.

Example 20

A vehicle cargo carrier the vehicle cargo carrier comprising: (a) a coupling assembly configured to selectively attach to a vehicle; and (b) a storage assembly configured to selectively attach to the coupling assembly such that the storage assembly is operative attached to the vehicle, the storage assembly comprising: (i) a first storage body, wherein the first storage body defines an inflow vent configured to receive an air stream from an exterior of the first storage body to an interior of the first storage body, (ii) a second storage body, wherein the first storage body is configured to move relative to the second storage body from a closed position to an open position, wherein the first storage body and the second storage body define an internal storage chamber while the first storage body is in the closed position, and (iii) an inflow control member configured to transition from a first position to a second position, wherein the inflow control member is configured to block the air stream from entering the interior of the first storage body in the first position, wherein the inflow control member in configured to allow the air stream to enter the interior of the first storage body in the second position.

III. Miscellaneous

It should also be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A vehicle cargo carrier, the vehicle cargo carrier comprising:
   (a) a coupling assembly configured to selectively attach to a vehicle; and
   (b) a storage assembly configured to selectively attach to the coupling assembly such that the storage assembly is operative attached to the vehicle, the storage assembly comprising:
      (i) a first storage body, wherein the first storage body defines an inflow vent comprising a first opening, wherein the inflow vent is configured to receive a fluid from an exterior of the first storage body to an interior of the first storage body,
      (ii) a second storage body, wherein the first storage body is configured to move relative to the second storage body from a closed position to an open position, wherein the first storage body and the second storage body define an internal storage chamber while the first storage body is in the closed position, and
      (iii) a fluid redirection member, wherein the fluid redirection member comprises:
         (A) a base attached to either the interior of the first storage body or an interior of the second storage body, wherein the base defines a first open end spaced a longitudinal distance away from the inflow vent, wherein the first open end is configured to receive a first portion of the fluid from the first opening of the inflow vent such that a second portion of the fluid from the first opening of the inflow vent may travel around the first open end, and
         (B) an insertable extension defining a second open end, wherein the second open end and the first open end are in fluid communication.

2. The vehicle cargo carrier of claim 1, wherein the first storage body defines an outflow vent located on a first end, wherein the inflow vent is located on a second end, wherein the first end and the second end are on opposite sides of the first storage body.

3. The vehicle cargo carrier of claim 1, wherein the storage assembly further comprises an inflow control member, wherein the inflow control member is configured to selectively limit the fluid from entering the interior of the first storage body.

4. The vehicle cargo carrier of claim 3, wherein the inflow control member is slidable relative to inflow vent.

5. The vehicle cargo carrier of claim 1, further comprising a freshener screen that is selectively attachable to the first storage body.

6. The vehicle cargo carrier of claim 1, wherein the insertable extension is configured to fit within an interior of a shoe.

7. The vehicle cargo carrier of claim 1, wherein the insertable extension is rigid.

8. The vehicle cargo carrier of claim 1, wherein the insertable extension is resilient.

9. The vehicle cargo carrier of claim 1, wherein the insertable extension is moldable.

10. The vehicle cargo carrier of claim 1, wherein the base is attached to either the interior of the first storage body of the interior or the second storage body via an adhesive.

11. The vehicle cargo carrier of claim 1, wherein the base is removably attached to either the interior of the first storage body or the interior of the second storage body.

12. The vehicle cargo carrier of claim 11, wherein the base is removably attached via an L-shaped coupling hook.

13. The vehicle cargo carrier of claim 1, wherein the first storage body and the second storage body are coupled via a hinge.

14. The vehicle cargo carrier of claim 1, wherein the coupling assembly comprises a magnet.

15. The vehicle cargo carrier of claim 1, wherein the coupling assembly comprises an elongated rail defining a T-slot.

16. The vehicle cargo carrier of claim 15, wherein the T-slot of the elongated rail has an open end and a closed end.

17. The vehicle cargo carrier of claim 1, wherein the base is repositionable.

18. A vehicle cargo carrier, the vehicle cargo carrier comprising:
   (a) a coupling assembly configured to selectively attach to a vehicle; and
   (b) a storage assembly configured to selectively attach to the coupling assembly such that the storage assembly is operative attached to the vehicle, the storage assembly comprising:
      (i) a first storage body, wherein the first storage body defines an inflow vent configured to receive an air stream from an exterior of the first storage body to an interior of the first storage body,
      (ii) a second storage body, wherein the first storage body is configured to move relative to the second storage body from a closed position to an open position, wherein the first storage body and the second storage body define an internal storage chamber while the first storage body is in the closed position, and
      (iii) a fluid redirection member, wherein the fluid redirection member comprises:
         (A) a base attached to either the interior of the first storage body or an interior of the second storage body, wherein the base defines a first open end spaced a distance from the inflow vent to define a gap between the first open end and the inflow vent, and
         (B) an insertable extension defining a second open end, wherein the second open end and the first open end are in fluid communication.

19. A vehicle cargo carrier the vehicle cargo carrier comprising:
   (a) a coupling assembly configured to selectively attach to a vehicle; and
   (b) a storage assembly configured to selectively attach to the coupling assembly such that the storage assembly is operative attached to the vehicle, the storage assembly comprising:
      (i) a first storage body comprising a first interior surface, wherein the first storage body defines an inflow vent configured to receive an air stream from an exterior of the first storage body to an interior of the first storage body,
      (ii) a second storage body comprising a second interior surface, wherein the first storage body is configured to move relative to the second storage body from a closed position to an open position, wherein the first interior surface of the first storage body and the second interior surface of the second storage body define an internal storage chamber while the first storage body is in the closed position, and (iii) a fluid redirection member, wherein the fluid redirection comprises:

(A) a base attached to and extending from either the first interior surface or the second interior surface, wherein the base comprises face defining a first open end exposed to the internal storage chamber while the first storage body is in the closed position, wherein the first open end is configured to receive a portion of the air stream from the inflow vent, and (B) an insertable extension defining a second open end, wherein the second open end and the first open end are in fluid communication.

20. The vehicle cargo carrier of claim 18, wherein the first open end is configured to receive a first portion of the air stream from the inflow vent via the gap such that a second portion of the air stream from the inflow vent may travel around the first open end via the gap.

* * * * *

UNITED STATES PATENT AND TRADEMARK OFFICE
CERTIFICATE OF CORRECTION

PATENT NO.         : 10,583,785 B1
APPLICATION NO.    : 16/018141
DATED              : March 10, 2020
INVENTOR(S)        : Timothy A. Bulcher et al.

It is certified that error appears in the above-identified patent and that said Letters Patent is hereby corrected as shown below:

In the Claims

Column 15, Claim 4, Line 52, reads "...slidable relative to inflow vent." which should be deleted and replaced with "...slidable relative to the inflow vent."

Column 16, Claim 18, Lines 24-25, read "...storage assembly is operative attached to..." which should be deleted and replaced with "...storage assembly is operatively attached to...."

Column 16, Claim 19, Line 49, reads "A vehicle cargo carrier the vehicle cargo..." which should be deleted and replaced with "A vehicle cargo carrier, the vehicle cargo..."

Column 16, Claim 19, Lines 54-55, read "...storage assembly is operative attached to..." which should be deleted and replaced with "...storage assembly is operatively attached to..."

Column 17, Claim 19, Line 7, reads "...the base comprises face defining a first..." which should be deleted and replaced with "...the base comprises a face defining a first..."

Signed and Sealed this
First Day of September, 2020

Andrei Iancu
*Director of the United States Patent and Trademark Office*